United States Patent [19]
Nicholson

[11] 3,762,831
[45] Oct. 2, 1973

[54] SELF-CENTERING CHAMFER TOOL
[76] Inventor: Joseph M. Nicholson, 27840 Southpointe, Grosse Ile, Mich. 48138
[22] Filed: May 4, 1971
[21] Appl. No.: 140,042

[52] U.S. Cl.................. 408/146, 408/198, 408/713
[51] Int. Cl........................ B23b 27/16, B23b 51/10
[58] Field of Search................... 408/198, 197, 713, 408/83, 81, 82, 146

[56] References Cited
UNITED STATES PATENTS

| | | | |
|---|---|---|---|
| 2,164,741 | 7/1939 | Green | 408/197 X |
| 3,099,174 | 7/1963 | Cogsdill | 408/83 X |
| 2,637,227 | 5/1953 | McIntosh | 408/713 X |
| 3,400,616 | 9/1968 | Mihic | 408/713 X |
| 3,645,640 | 2/1972 | Zukas | 408/82 |
| 83,348 | 10/1868 | Whitney | 408/146 |
| 2,958,241 | 11/1960 | Wahli | 408/146 |

Primary Examiner—Andrew R. Juhasz
Assistant Examiner—Z. R. Bilinsky
Attorney—Donnelly, Mentag & Harrington

[57] ABSTRACT

A self-centering chamfer tool having a cylindrical body, a conically shaped nosepiece adaptor detachably mounted on the front end of the body and provided with a tool slot, a tool holder bar mounted in said body, a chamfering tool carried on the front end of said tool holder bar and adapted to be positioned in said slot for chamfering engagement with a bore in a workpiece, means for normally biasing said tool holder bar and tool rearwardly in said body, adjusting means mounted on the rear end of said body for moving the tool holder bar and chamfering tool forwardly against the action of said biasing means to adjust the position of the chamfering tool in said slot, and locking means for retaining said adjusting means in an adjusted position.

3 Claims, 6 Drawing Figures

PATENTED OCT 2 1973
3,762,831
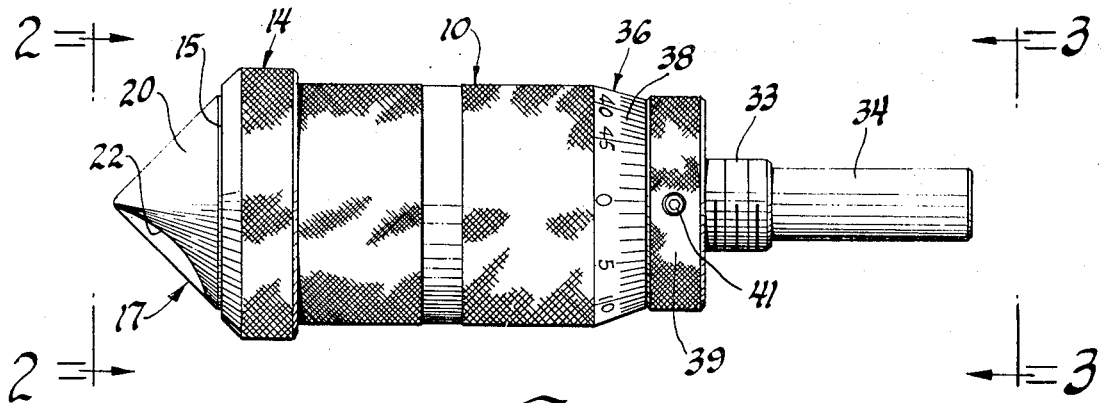
Fig. 1
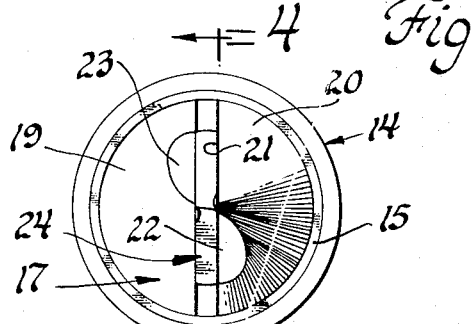
Fig. 2
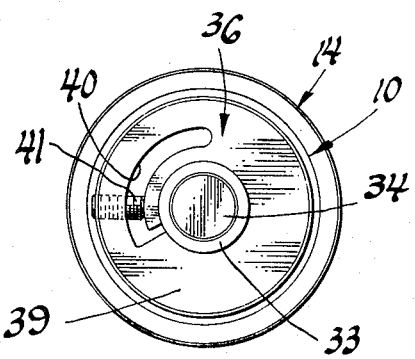
Fig. 3
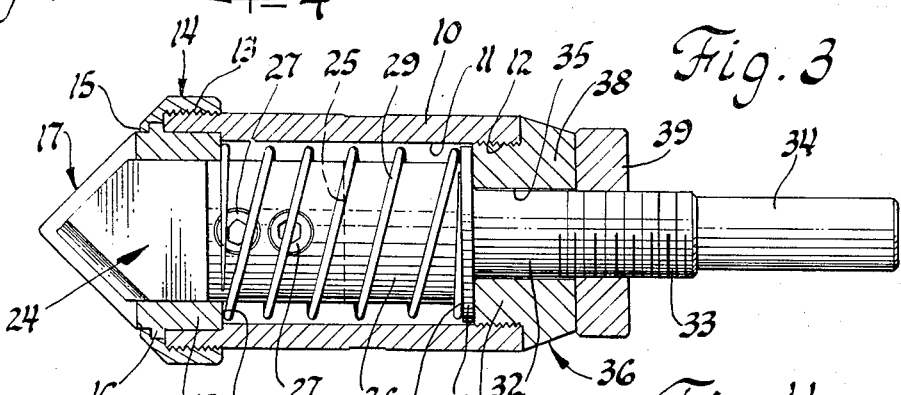
Fig. 4
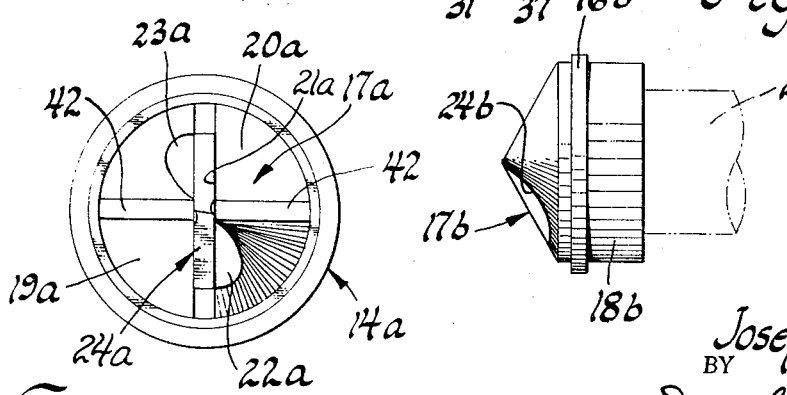
Fig. 5
Fig. 6
INVENTOR.
Joseph M. Nicholson
BY
Donnelly, Mentag & Harington
ATTORNEYS 3,762,831

SELF-CENTERING CHAMFER TOOL

SUMMARY OF THE INVENTION

This invention relates generally to the chamfer tool art, and more particularly, to a novel and improved self-centering chamfer tool made in accordance with the principles of the present invention.

It is an important object of the present invention to provide a novel and improved self-centering chamfer tool which automatically centers a chamfer tool in a bore in a workpiece which is to be chamfered.

It is another object of the present invention to provide a novel and improved self-centering chamfer tool which provides accurate depth control for a chamfer tool and which can be rotated at a speed faster than the prior art chamfering tools so as to provide increased production.

It is still another object of the present invention to provide a novel and improved self-centering chamfer tool which is provided with a replaceable nosepiece adaptor that is conically shaped and made from a material having good wear characteristics, as for example, molded solid carbide, or a suitable tool steel provided with a plurality of inlaid carbide wear strips.

It is a further object of the present invention to provide a novel and improved self-centering chamfer tool which is simple and compact in construction, economical to manufacture and efficient in use.

It is still another object of the present invention to provide a novel and improved self-centering chamfer tool having a cylindrical body, a conically shaped nosepiece adaptor detachably mounted on the front end of the body and provided with a tool slot, a tool holder bar mounted in said body, a chamfering tool carried on the front end of said tool holder bar and adapted to be positioned in said slot for chamfering engagement with a bore in a workpiece, means for normally biasing said tool holder bar and tool rearwardly in said body, adjusting means mounted on the rear end of said body for moving the tool holder bar and chamfering tool forwardly against the action of said biasing means to adjust the position of the chamfering tool in said slot, and locking means for retaining said adjusting means in an adjusted position.

Other objects, features and advantages of this invention will be apparent from the following detailed description, appended claims, and the accompanying drawing.

BRIEF DESCRIPTION OF THE DRAWING

FIG. 1 is a side elevational view of a self-centering chamfer tool made in accordance with the principles of the present invention.

FIG. 2 is a front end elevational view of the structure illustrated in FIG. 1, taken along the line 2—2 thereof, and looking in the direction of the arrows.

FIG. 3 is a rear end view of the structure illustrated in FIG. 1, taken along the line 3—3 thereof, and looking in the direction of the arrows.

FIG. 4 is a longitudinal, elevational section view of the structure illustrated in FIG. 2, taken along the line 4—4 thereof, and looking in the direction of the arrows.

FIG. 5 is a front end view, similar to FIG. 2, of a modified self-centering chamfer tool made in accordance with the principles of the present invention.

FIG. 6 is a side elevational view of a modified nosepiece adaptor employed in a self-centering chamfer tool made in accordance with the principles of the present invention, and showing the nosepiece adaptor having an angle different than the angle on the nosepiece adaptor illustrated in FIG. 1.

DESCRIPTION OF THE PREFERRED EMBODIMENTS

Referring now to the drawing, and in particular to FIGS. 1 and 4, the numeral 10 generally designates an elongated cylindrical tool body made from a suitable tool steel and which is provided with an axial bore 11 that extends completely through the body 10. As shown in FIG. 4, the rear end of the bore 11 is threaded as indicated by the numeral 12. The front end of the body 10 is threaded around the outer periphery thereof, as indicated by numeral 13. Threadably mounted on the threaded front end 13 of the body 10 is a retainer collar, generally indicated by the numeral 14, which is provided with a radial, inwardly extended flange 15.

As shown in FIG. 4, the flange 15 of the retainer collar 14 is adapted to engage the outer face of a flange 16 on a nosepiece adaptor generally indicated by the numeral 17. The nosepiece adaptor 17 is provided with an integral inwardly extended sleeve 18 which is slidably mounted in the front end of the body bore 11.

As shown in FIG. 2, the nosepiece adaptor 17 includes the pointed or conically shaped front end that comprises the two half-conical portions 19 and 20 which are divided by a diametrical slot 21. The conical end portions 19 and 20 are each provided with a relief or recess, as 22 and 23, respectively, adjacent the slot 21. The recesses 22 and 23 function as chip clearances. Projecting through the slot 21 is a chamfering tool in the form of a cutter blade generally indicated by the numeral 24. As shown in FIG. 4, the chamfering tool 24 is slidably mounted in a transverse slot 25 formed in the front end of a tool holder bar 26. The chamfering tool 24 is releasably secured in the slot 25 by any suitable means, as by a pair of set screws 27. As shown in FIG. 4, a flange 28 is integrally formed on the rear end of the tool holder bar 26. A suitable coil spring 29 is operatively mounted about the tool holder bar 26 in the body bore 11. The front end of the spring 29 abuts the shoulder 30 on the rear end of the sleeve 18 on the nosepiece adaptor 17, and the rear end of the spring 29 abuts the shoulder 31 on the flange 28. The spring 29 functions to bias the tool holder bar 26 and the tool 24 inwardly or to the right, as viewed in FIG. 4.

As shown in FIG. 4, a rearwardly extended, non-threaded shaft 32 is integrally attached to the rear face of the tool bar flange 28 and it is integrally connected to a second threaded integral shaft 33 which in turn is integrally connected to a reduced end shaft 34. The non-threaded shaft 32 passes through the bore 35 which is formed through an adjusting member or sleeve 36. The adjusting sleeve 36 is provided with a reduced inner end portion 37 which is threadably mounted in the threaded end 12 of the body bore 11. As shown in FIG. 1, the adjusting means or sleeve 36 is provided with indicia 38 for indicating to the operator the adjustment movement imparted to the cutter 24 when the adjusting sleeve 36 is rotated. The adjustment to the tool 24 is effected by means of the inner end of the adjusting sleeve portion 37 engaging the rear face of the flange 28 so as to exert an inward and forward pressure on the tool holder bar 26 and the tool 24, or to the left as viewed in FIG. 4.

As shown in FIGS. 1, 3 and 4, a locking collar 39 is threadably mounted on the threaded shaft portion 33 for locking engagement with the adjusting sleeve 36 to hold the same in an adjusted position. The locking collar 39 is secured in an adjusted position by means of the set screw 41.

It will be understood that the nosepiece adaptor 17 may be made from any suitable material for wear purposes, as for example, a molded solid carbide.

FIG. 5 shows a modified nosepiece 17a in which the parts that are identical to the nosepiece 17 of FIG. 1 have been marked with the same reference numerals followed by the small letter a. In the embodiment of FIG. 5, the nosepiece 17a is made from a suitable tool steel, and a pair of ¼ inch wide carbide wear strips 42 are inlaid in the conical nose half portions 19a and 20a.

FIG. 6 illustrates a modified nosepiece adaptor 17b in which the parts corresponding to the parts of the nosepiece 17 of FIGS. 1 and 4 have been marked with the same reference numerals followed by the small letter b. The nosepiece 17b has a different angle on the front end thereof as compared to the conical nosepiece 17 in FIG. 1. FIGS. 1 and 6 illustrate that many interchangeable nosepiece adaptors 17 may be provided wherein each nosepiece adaptor has a different angle for chamfering a different angled bore in a workpiece. They can be quickly and easily inserted into the body 10 for use with a correspondingly angled chamfering tool 24.

In use, the locking collar 39 is loosened to permit the adjusting sleeve 36 to be turned so as to move the chamfering tool 24 outwardly through the slot 21 to the desired position for the desired chamfer depth. After the tool 24 has been set, the locking collar 39 is moved into a locking position against the adjusting sleeve 36 and secured in place by the set screw 41. The conical half portion 19 and 20 on the nosepiece adaptor function to center the tool in a hole being chamfered.

Experience has shown that a self-centering chamfer tool of the present invention can be operated at a higher speed than the prior art chamfering tools, and that it is chatterless.

The chamfering tool of the present invention also provides accurate depth control, and it can be rotated at a speed faster than the prior art chamfering tools. The tool is moved into a hole in a workpiece which is to be chamfered until the conical nosepiece adaptor 17 engages the workpiece at which time the proper depth chamfer is completed on the workpiece. The nosepiece adaptor 17 does not damage the workpiece because the molded solid carbide and carbide strips 42 have good wear qualities. It will be understood that more than two of the wear strips 42 may be provided as desired.

While it will be apparent that the preferred embodiments of the invention herein disclosed are well calculated to fulfill the objects above stated, it will be appreciated that the invention is susceptible to modification, variation and change.

What is claimed is:

1. A self-centering chamfer tool comprising:
    a. a cylindrical body;
    b. a conically shaped nosepiece adaptor detachably mounted on the front end of said body and provided with a tool slot;
    c. a tool holder bar mounted in said body;
    d. a chamfering tool carried on the front end of said tool holder bar and adapted to be positioned in said slot for chamfering engagement with a bore in a workpiece;
    e. means for normally biasing said tool holder bar and tool rearwardly in said body;
    f. adjusting means mounted on the rear end of said body for engagement with said tool holder bar and for moving said tool holder bar and chamfering tool forwardly against the action of said biasing means to adjust the position of the tool in said slot; and,
    g. locking means for retaining said adjusting means in an adjusted position to lock the tool in an adjusted position in the slot .

2. A self-centering chamfering tool as defined in claim 1, wherein:
    a. said conically shaped nosepiece adaptor is made from material having good wear characteristics.

3. A self-centering chamfering tool as defined in claim 1, wherein:
    a. said conically shaped nosepiece adaptor is provided with a plurality of wear strips made from a material having good wear characteristics.

* * * * *